US012115789B2

(12) United States Patent
Kohnotoh

(10) Patent No.: US 12,115,789 B2
(45) Date of Patent: Oct. 15, 2024

(54) INKJET PRINTING APPARATUS

(71) Applicant: CANON KABUSHIKI KAISHA, Tokyo (JP)

(72) Inventor: Atsushi Kohnotoh, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 553 days.

(21) Appl. No.: 16/750,142

(22) Filed: Jan. 23, 2020

(65) Prior Publication Data

US 2020/0156377 A1 May 21, 2020

Related U.S. Application Data

(63) Continuation of application No. 15/956,129, filed on Apr. 18, 2018, now Pat. No. 10,576,745.

(30) Foreign Application Priority Data

May 11, 2017 (JP) ................................ 2017-094766

(51) Int. Cl.
*B41J 2/165* (2006.01)
*B41J 11/02* (2006.01)

(52) U.S. Cl.
CPC ....... *B41J 2/16511* (2013.01); *B41J 2/16508* (2013.01); *B41J 2/16538* (2013.01); (Continued)

(58) Field of Classification Search
None
See application file for complete search history.

(56) References Cited

U.S. PATENT DOCUMENTS 6,497,466 B1 12/2002 Writt
7,527,349 B2 5/2009 Jung et al.
(Continued)

FOREIGN PATENT DOCUMENTS

JP S64-063180 A 3/1989
JP 2002-127437 A 5/2002
(Continued)

OTHER PUBLICATIONS

Mar. 22, 2022 Office Action in Japanese Patent Application No. 2018-089226 (with English translation).

*Primary Examiner* — Douglas X Rodriguez
*Assistant Examiner* — Tracey M McMillion
(74) *Attorney, Agent, or Firm* — Venable LLP

(57) ABSTRACT

There is provided an inkjet printing apparatus capable of efficiently performing print preparation in a standby state. For this purpose, the inkjet printing apparatus includes: a cap moving unit for bringing a cap member for protecting an ejection opening surface of a print head into or out of intimate contact with the ejection opening surface; and a positioning unit for positioning the print head so as to achieve a printing operation. The positioning unit allows a reference portion disposed at the print head to abut against a distance defining member for defining a predetermined distance between the ejection opening surface 8*a* and the platen so as to position the print head. At this time, the distance defining member is inserted into a portion at which the reference portion can abut in association with operation in which the cap moving unit separates the cap member from the ejection opening surface.

16 Claims, 12 Drawing Sheets

(52) U.S. Cl.
CPC ....... *B41J 2/16541* (2013.01); *B41J 2/16544* (2013.01); *B41J 2/16552* (2013.01); *B41J 2/16588* (2013.01); *B41J 11/02* (2013.01); *B41J 2/16514* (2024.05); *B41J 2002/16558* (2013.01)

(56) References Cited

U.S. PATENT DOCUMENTS

| | | | | |
|---|---|---|---|---|
| 8,430,585 | B2 | 4/2013 | Hendricks et al. | |
| 8,714,846 | B2 | 5/2014 | Okuda et al. | |
| 8,848,208 | B2 | 9/2014 | Sumioka | |
| 2004/0169712 | A1 | 9/2004 | Tsuji | |
| 2004/0265029 | A1 | 12/2004 | Ota | |
| 2007/0040864 | A1 | 2/2007 | Jung et al. | |
| 2007/0046721 | A1* | 3/2007 | Miyazawa | B41J 2/16508 347/29 |
| 2007/0182770 | A1* | 8/2007 | Yoshida | B41J 11/0035 347/6 |
| 2007/0188538 | A1* | 8/2007 | Izuo | B41J 29/393 347/19 |
| 2011/0199412 | A1* | 8/2011 | Nakayama | B41J 11/0035 347/14 |
| 2014/0035983 | A1* | 2/2014 | Kyotani | B41J 2/07 347/14 |
| 2015/0352868 | A1* | 12/2015 | Sekino | B41J 25/3082 347/37 |
| 2018/0056658 | A1* | 3/2018 | Kobayashi | B41J 29/38 |

FOREIGN PATENT DOCUMENTS

| | | | |
|---|---|---|---|
| JP | 2007-038611 | A | 2/2007 |
| JP | 2007-050704 | A | 3/2007 |
| JP | 2009-248529 | A | 10/2009 |
| JP | 2010-036345 | A | 2/2010 |
| JP | 2014-065293 | A | 4/2014 |

* cited by examiner

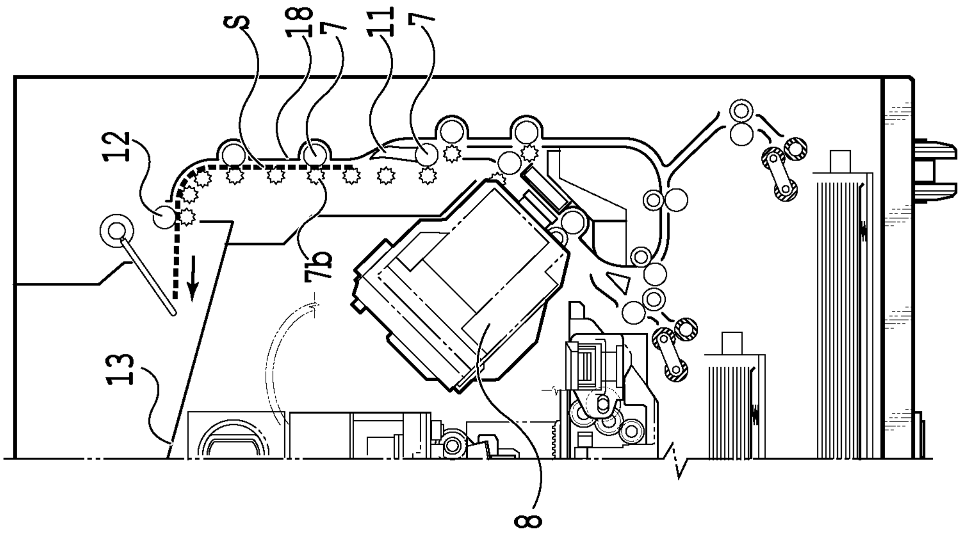
FIG.4C
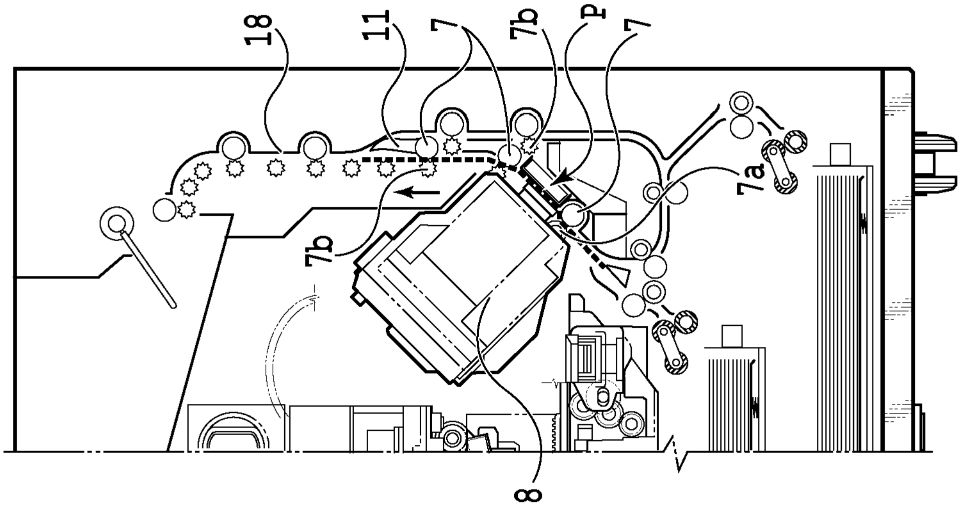
FIG.4B
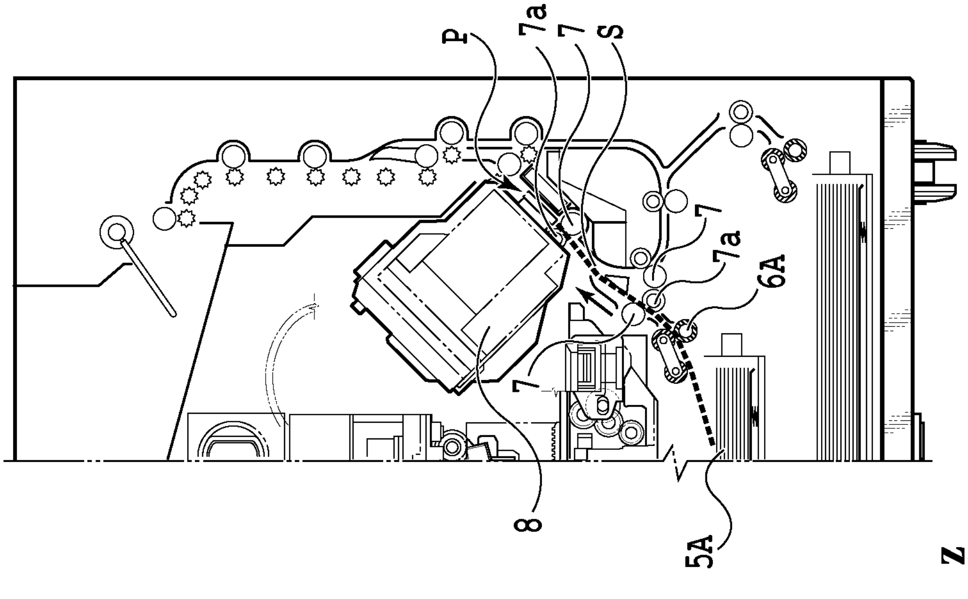
FIG.4A
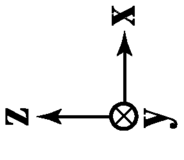

INKJET PRINTING APPARATUS

This application is a continuation of application No. 15/956,129 filed Apr. 18, 2018.

BACKGROUND OF THE INVENTION

Field of the Invention

The present invention relates to an inkjet printing apparatus.

Description of the Related Art

U.S. Pat. No. 8,430,585 discloses a full line type inkjet printing apparatus in which a print head is configured to be moved in a vertical direction and to be positioned. More specifically, a spacer is inserted between a reference surface of an apparatus and a reference surface of a print head in order to properly adjust a distance (a print gap) between the print head and a platen. After the insertion, the print head is descended by the use of a drive motor down to a position in which the reference surfaces are brought into contact with each other via the spacer.

Although U.S. Pat. No. 8,430,585 discloses using the drive motor for elevating the print head, it does not disclose comprising a drive mechanism for inserting the spacer, and therefore, a user seems to manually insert the spacer. In some modes of typical inkjet printing apparatuses, a print head is capped with a cap member when no print operation is performed. U.S. Pat. No. 8,430,585 does not disclose capping the print head. Consequently, the apparatus disclosed in U.S. Pat. No. 8,430,585 still has problems to be solved of the efficiency of preparation for printing required in a standby state.

SUMMARY OF THE INVENTION

The present invention aims to provide an inkjet printing apparatus capable of efficiently performing print preparation in a standby state.

According to a first aspect of the present invention, there is provided an inkjet printing apparatus comprising: a head unit including a print head provided with an ejection opening surface for ejecting ink and performing a print operation with respect to a print medium; a platen unit including a platen configured to support a print medium opposite to the ejection opening surface in a case where the print head performs the print operation; a spacer member configured to define a distance between the ejection opening surface and the platen in abutment against the head unit; a cap member configured to cap the ejection opening surface; and a cap moving unit configured to move the cap member with respect to the ejection opening surface, wherein the spacer member is moved in association with operation in which the cap moving unit moves the cap member.

According to a second aspect of the present invention, there is provided an inkjet printing apparatus comprising: a head unit including a print head provided with an ejection opening surface for ejecting ink and performing a print operation with respect to a print medium; a platen unit including a platen configured to support a print medium opposite to the ejection opening surface in a case where the print head performs the print operation; a spacer member configured define a distance between the ejection opening surface and the platen; a cap member configured to cap the ejection opening surface; a cap moving unit configured to move the cap member with respect to the ejection opening surface, and a control unit configured to perform a moving of the cap member by the cap moving unit and a defining of the distance by the spacer member in parallel.

Further features of the present invention will become apparent from the following description of exemplary embodiments with reference to the attached drawings.

BRIEF DESCRIPTION OF THE DRAWINGS

FIGS. 4A to 4C are conveying path diagrams of a print medium fed from a first cassette;

DESCRIPTION OF THE EMBODIMENTS

Figure 1:
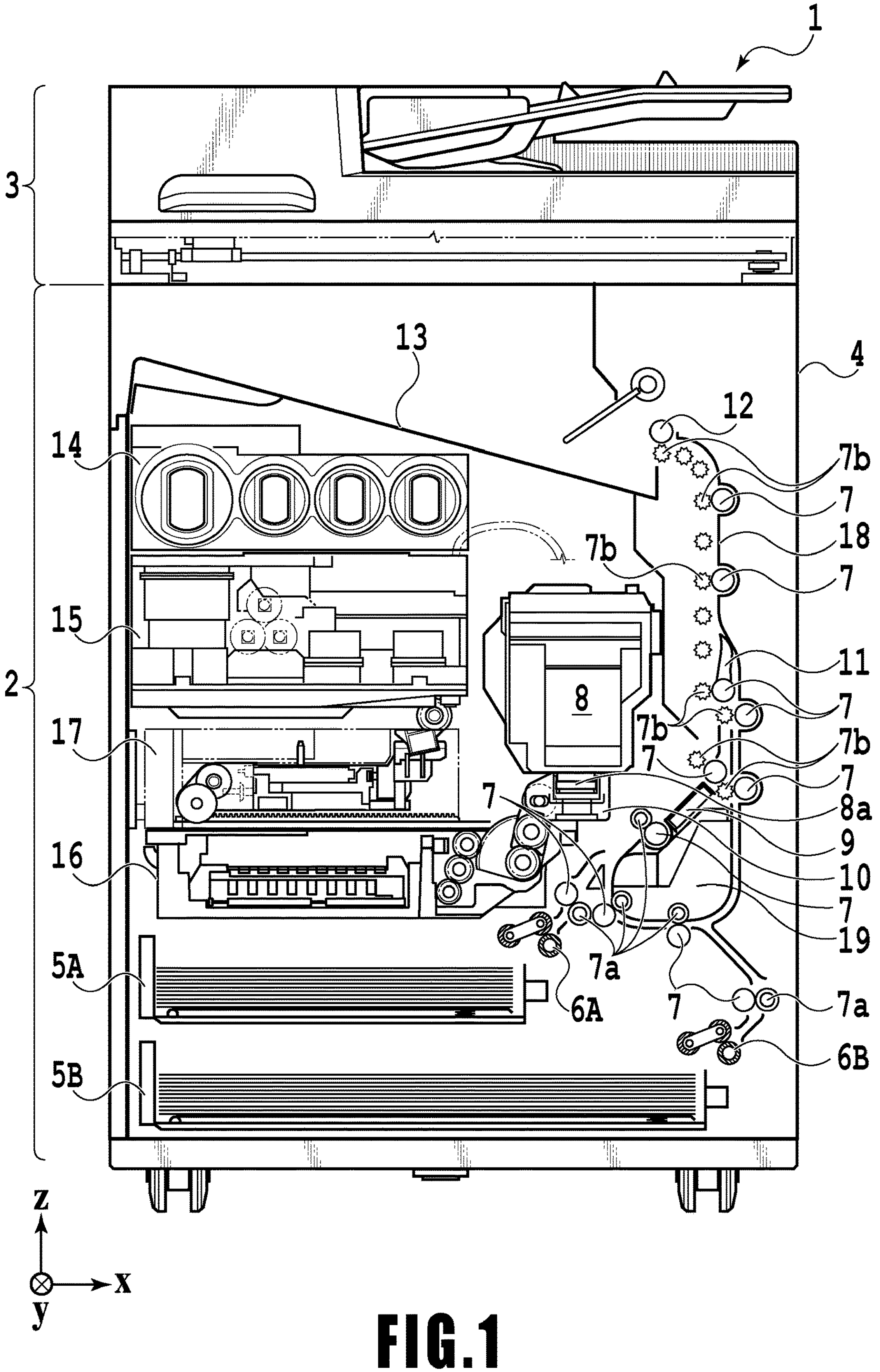
FIG. 1 is a diagram showing a printing apparatus in a standby state.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing a print medium (cut sheet) S are detachably provided at the bottom of a casing 4 in the vertical direction.

A relatively small print medium of up to A4 size is placed flat and housed in the first cassette 5A and a relatively large print medium of up to A3 size is placed flat and housed in the second cassette 5B. A first feeding unit 6A for sequentially feeding a housed print medium is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for placing and housing a print medium S that was subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. When the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction (a widthwise direction of a print medium) and supports, from the back side, a print medium S subjected to print operation by the print head 8. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
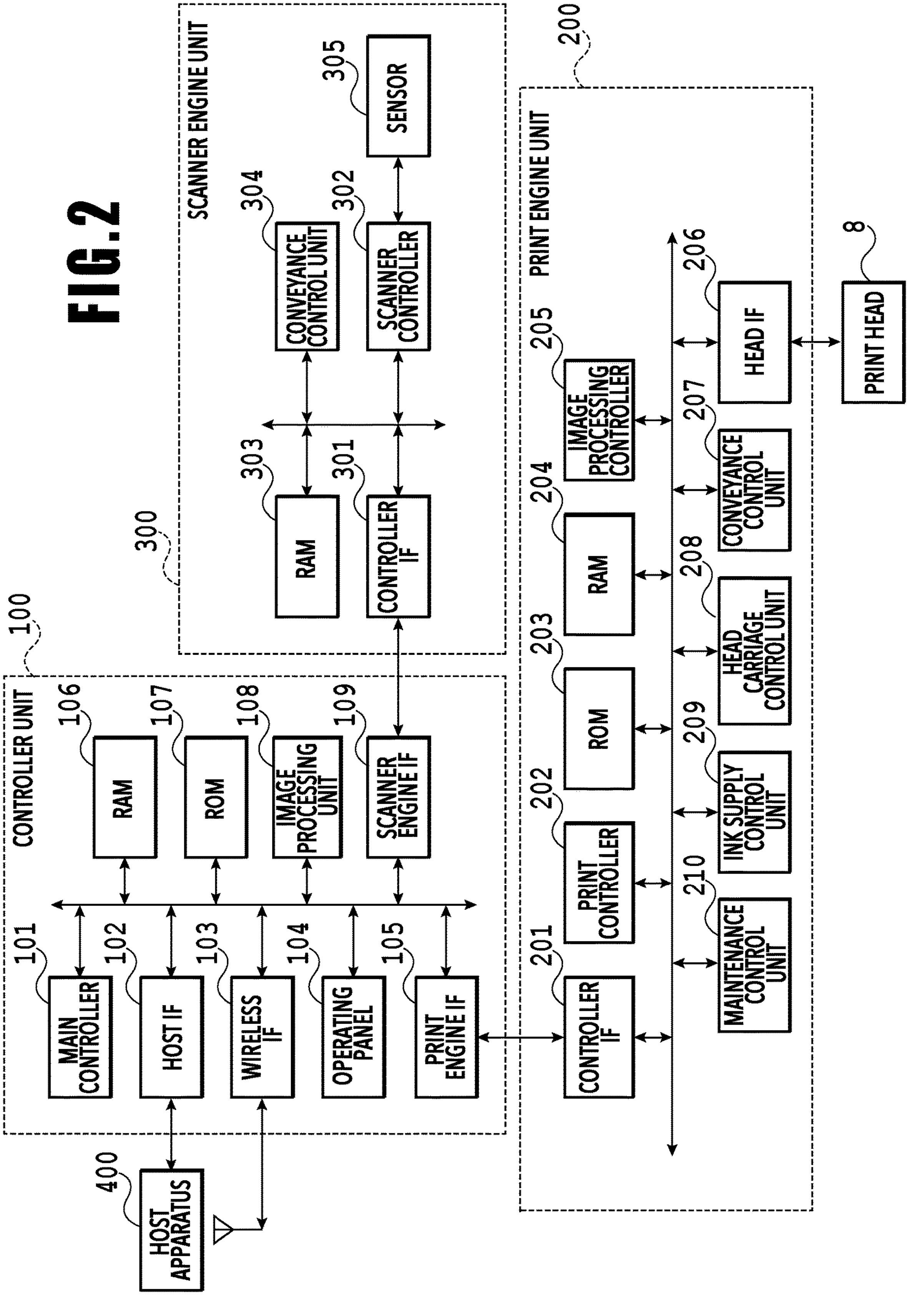
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. More specifically, the head carriage control unit 208 uses a moving mechanism (i.e., head moving means) including a first drive motor and gears to change the orientation or position of the head holder 20 having the print head 8 mounted thereon. In the present specification, a combination with the head holder 20 having the print head 8 mounted thereon is referred to as a print head unit. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8. More specifically, the maintenance control unit 210 uses a moving mechanism (i.e., cap moving means) including a second drive motor and gears to move the cap unit 10 or operates the wiping unit 17. The above-described conveyance control unit 207, head carriage control unit 208, ink supply control unit 209, and maintenance control unit 210 are adapted to control their respective mechanisms by using their individual drive sources (i.e., drive motors).

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
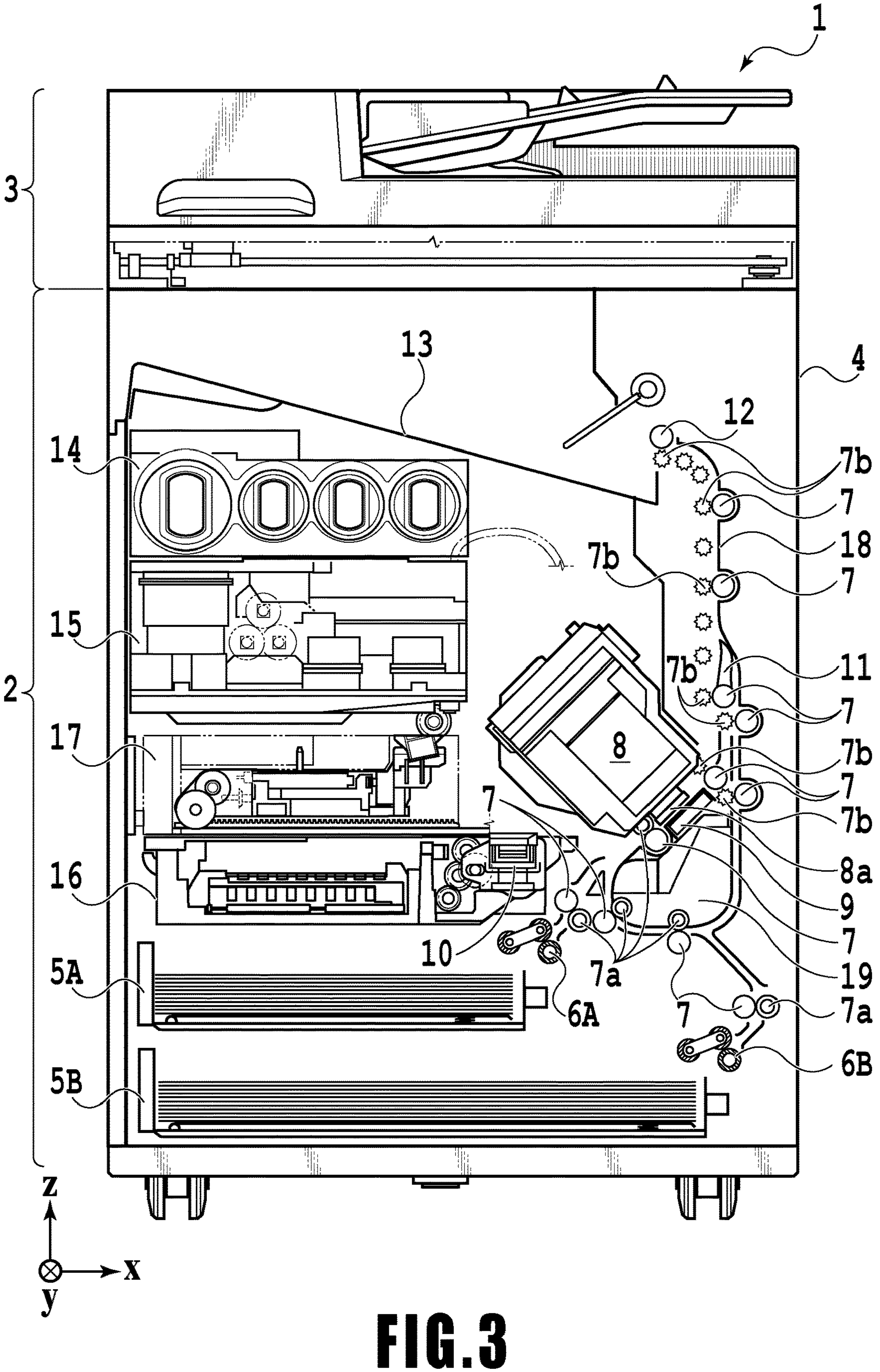
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position. Operation from the standby position to the printing position, that is, a print preparation operation will be described later in detail.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

FIGS. 4A to 4C are diagrams showing a conveying path in the case of feeding an A4 size print medium S from the first cassette 5A. A print medium S at the top of a print medium stack in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the conveying rollers 7 and the spurs 7*b* guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7*b* change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7*b*. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

Figure 5C:
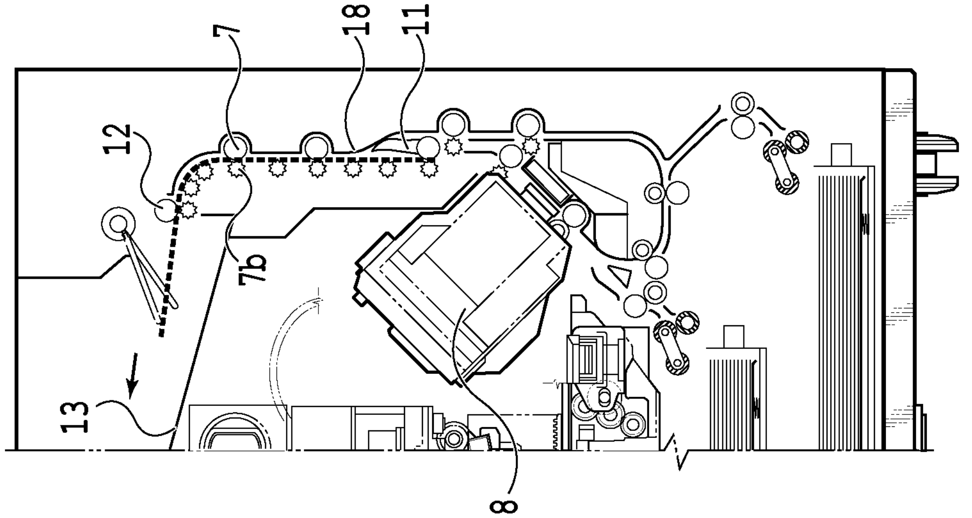
FIGS. 5A to 5C are conveying path diagrams of a print medium fed from a second cassette.
Figure 5B:
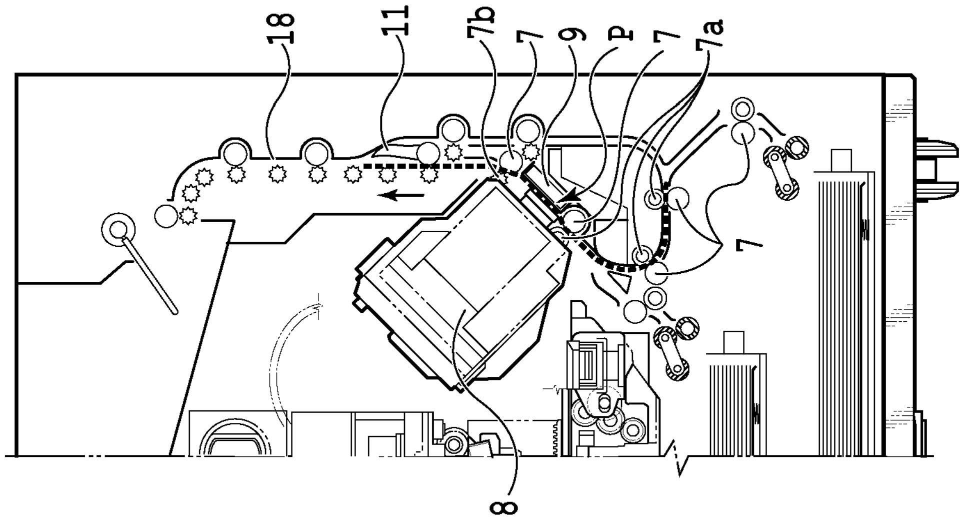
Figure 5A:
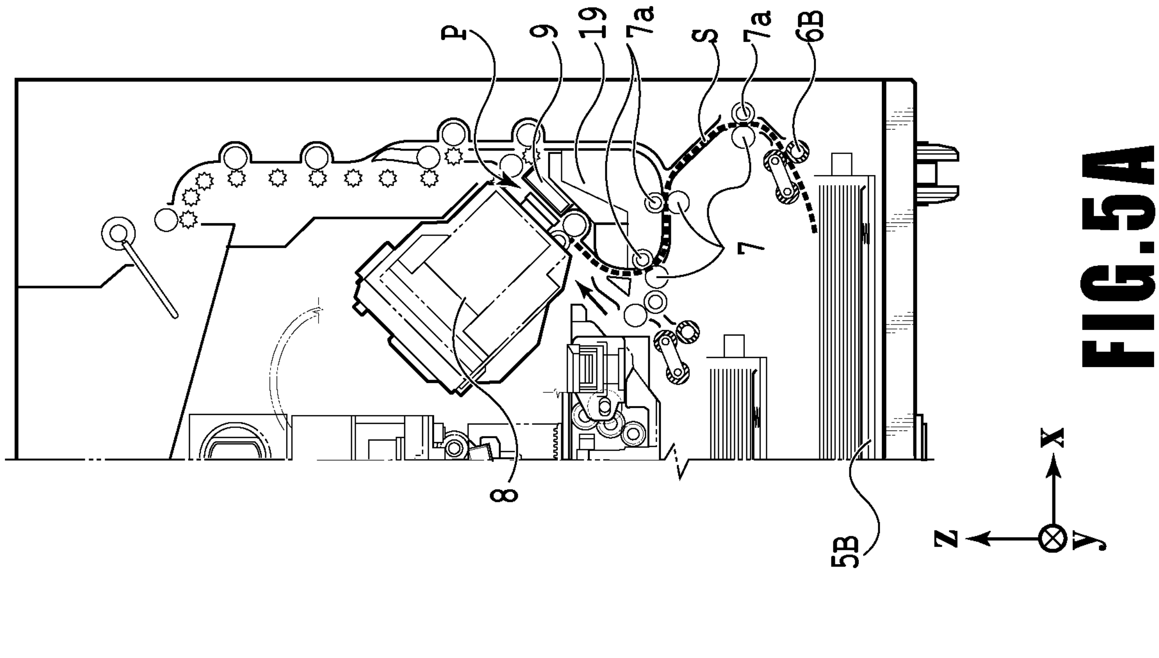

FIGS. 5A to 5C are diagrams showing a conveying path in the case of feeding an A3 size print medium S from the second cassette 5B. A print medium S at the top of a print medium stack in the second cassette 5B is separated from the rest of the stack by the second feeding unit 6B and conveyed toward the print area P between the platen 9 and the print head 8 while being nipped between the conveying rollers 7 and the pinch rollers 7*a*.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7*a*, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, a print operation is first performed for the first side (front side) and then is performed for the second side (back side). A conveying procedure during the print operation for the first side is the same as that shown in FIGS.

4A to 4C and, therefore, a description will be omitted. A conveying procedure subsequent to FIG. 4C will be described below.

Figure 6D:
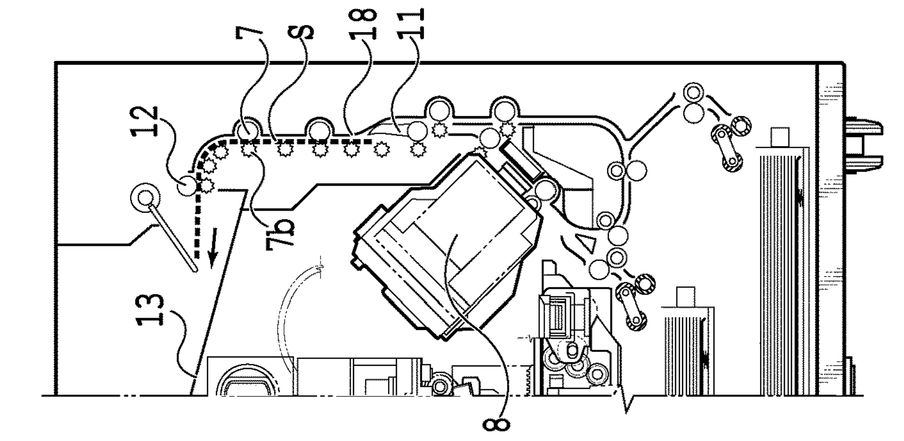
FIGS. 6A to 6D are conveying path diagrams in the case of performing print operation for the back side of a print medium.
Figure 6C:
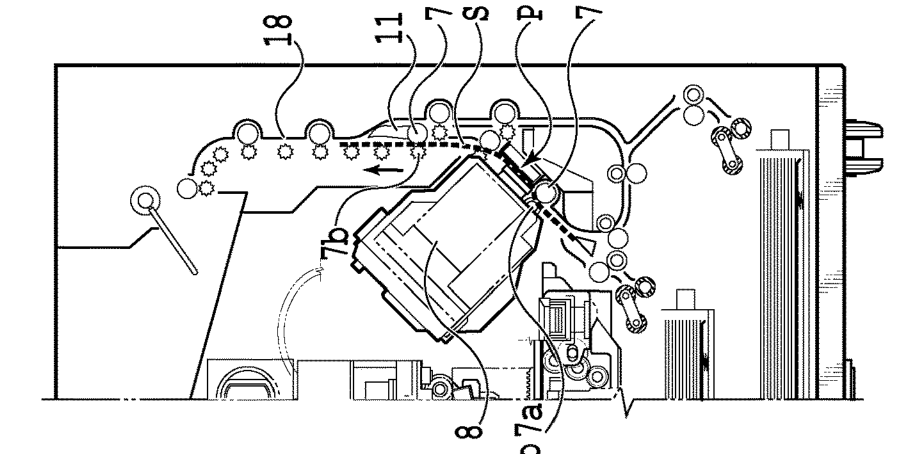
Figure 6B:
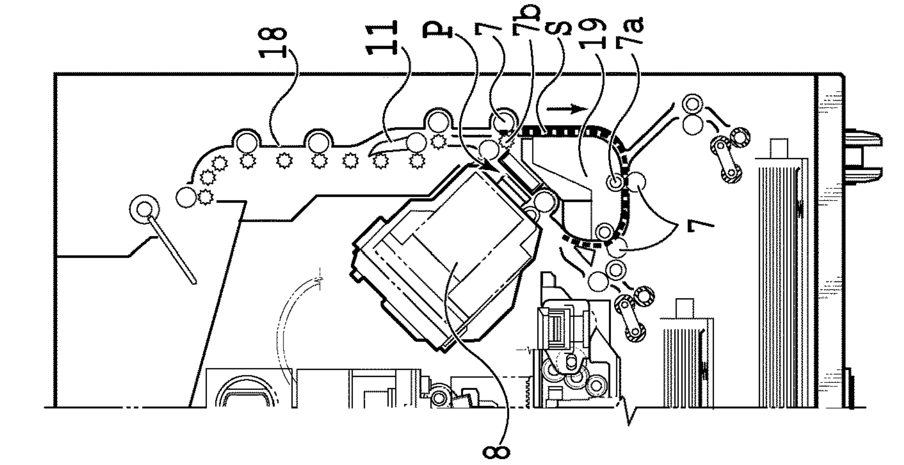
Figure 6A:
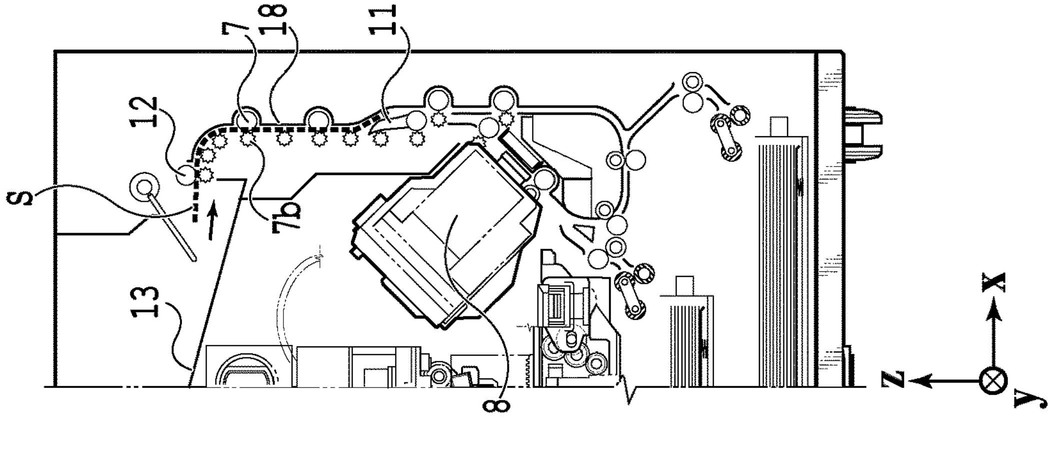

After the print head 8 finishes print operation for the first side and the back end of the print medium S passes by the flapper 11, the print controller 202 turns the conveying rollers 7 reversely to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the front end of the print medium S is about to reach the print area P for print operation for the second side.

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
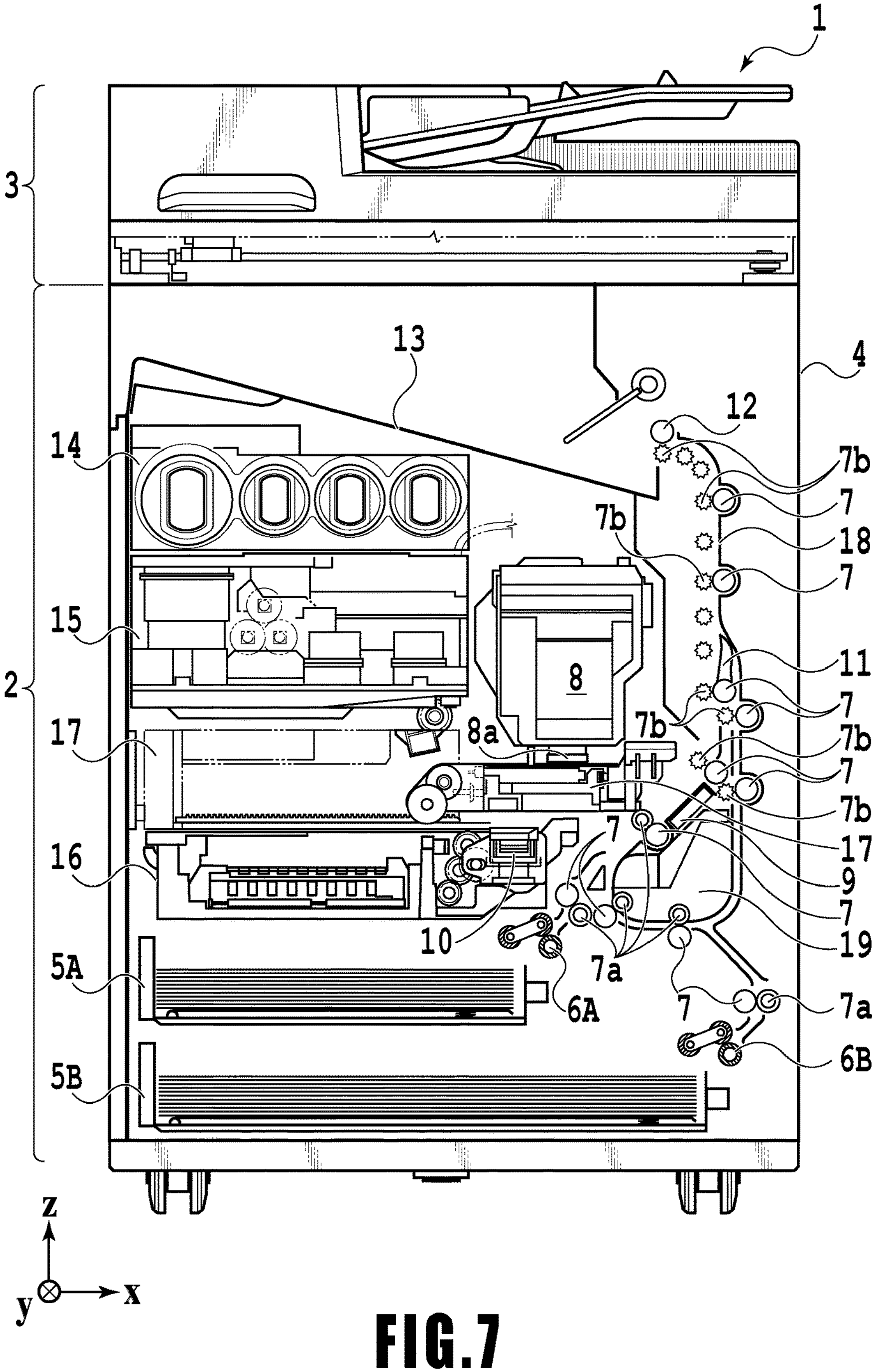
FIG. 7 is a diagram showing the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed by the maintenance unit 16.

Figure 8A:
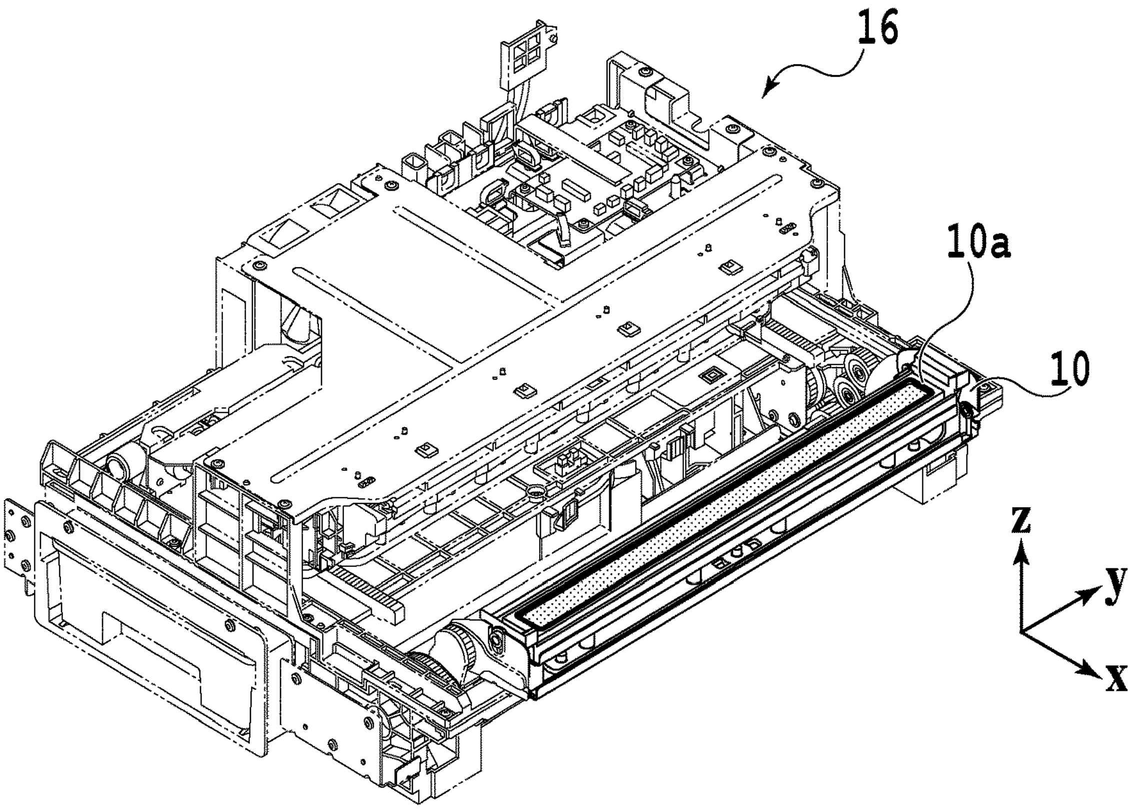
FIGS. 8A and 8B are perspective views showing the configuration of a maintenance unit.
Figure 8B:
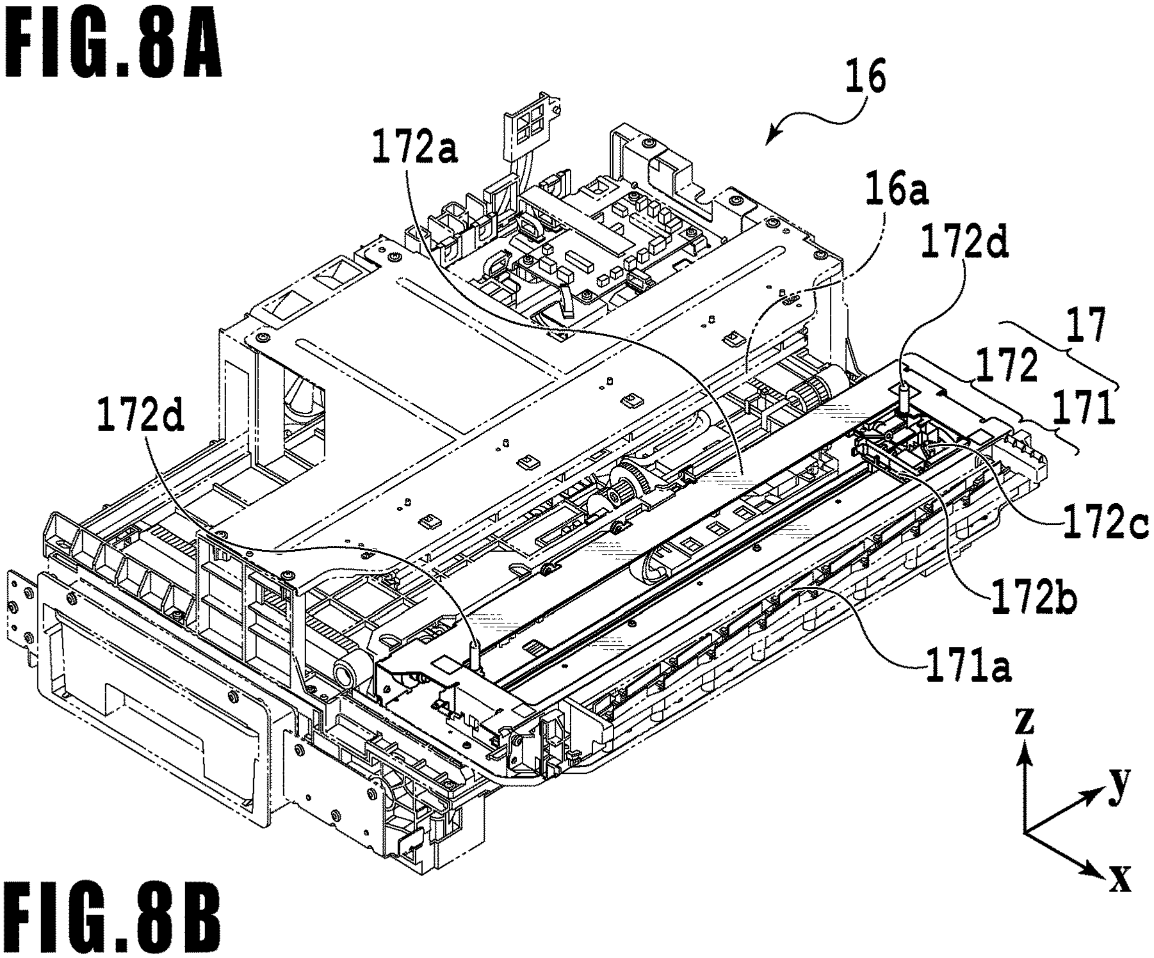

FIG. 8A is a perspective view showing the maintenance unit 16 in a standby position. FIG. 8B is a perspective view showing the maintenance unit 16 in a maintenance position. FIG. 8A corresponds to FIG. 1 and FIG. 8B corresponds to FIG. 7. When the print head 8 is in the standby position, the maintenance unit 16 is in the standby position shown in FIG. 8A, the cap unit 10 has been moved vertically upward, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 8B, the cap unit 10 has been moved vertically downward and the wiping unit 17 has been drawn from the maintenance unit 16. The wiping unit 17 comprises two wiper units: a blade wiper unit 171 and a vacuum wiper unit 172.

In the blade wiper unit 171, blade wipers 171*a* for wiping the ejection opening surface 8*a* in the x-direction are provided in the y-direction by the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. The wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

In the present embodiment, it is possible to carry out a first wiping process in which the blade wiper unit 171 performs wiping operation and the vacuum wiper unit 172 does not perform wiping operation and a second wiping process in which both the wiper units sequentially perform wiping operation. In the case of the first wiping process, the print controller 202 first draws the wiping unit 17 from the maintenance unit 16 while the print head 8 is evacuated vertically above the maintenance position shown in FIG. 7. The print controller 202 moves the print head 8 vertically downward to a position where the print head 8 can be in contact with the blade wipers 171*a* and then moves the wiping unit 17 into the maintenance unit 16. This movement enables the blade wipers 171*a* to wipe ink and the like adhering to the ejection opening surface 8*a*. That is, the blade wipers 171*a* wipe the ejection opening surface 8*a* when moving from a position drawn from the maintenance unit 16 into the maintenance unit 16.

After the blade wiper unit 171 is housed, the print controller 202 moves the cap unit 10 vertically upward and brings the cap member 10*a* into intimate contact with the ejection opening surface 8*a* of the print head 8. In this state, the print controller 202 drives the print head 8 to perform preliminary ejection and allows the suction pump to suck ink collected in the cap member 10*a*.

In the case of the second wiping process, the print controller 202 first slides the wiping unit 17 to draw it from the maintenance unit 16 while the print head 8 is evacuated vertically above the maintenance position shown in FIG. 7. The print controller 202 moves the print head 8 vertically downward to the position where the print head 8 can be in contact with the blade wipers 171*a* and then moves the wiping unit 17 into the maintenance unit 16. This movement enables the blade wipers 171*a* to perform wiping operation for the ejection opening surface 8*a*. Next, the print controller 202 slides the wiping unit 17 to draw it from the maintenance unit 16 to a predetermined position while the print head 8 is evacuated again vertically above the maintenance position shown in FIG. 7. Then, the print controller 202 uses the flat plate 172*a* and the dowel pins 172*d* to align the ejection opening surface 8*a* with the vacuum wiper unit 172 while moving the print head 8 down to a wiping position shown in FIG. 7. After that, the print controller 202 allows the vacuum wiper unit 172 to perform the wiping operation described above. After evacuating the print head 8 vertically upward and housing the wiping unit 17, the print controller 202 allows the cap unit 10 to perform preliminary ejection into the cap member and suction operation of collected ink in the same manner as the first wiping process.

(Print Preparation Operation)

Figure 9:
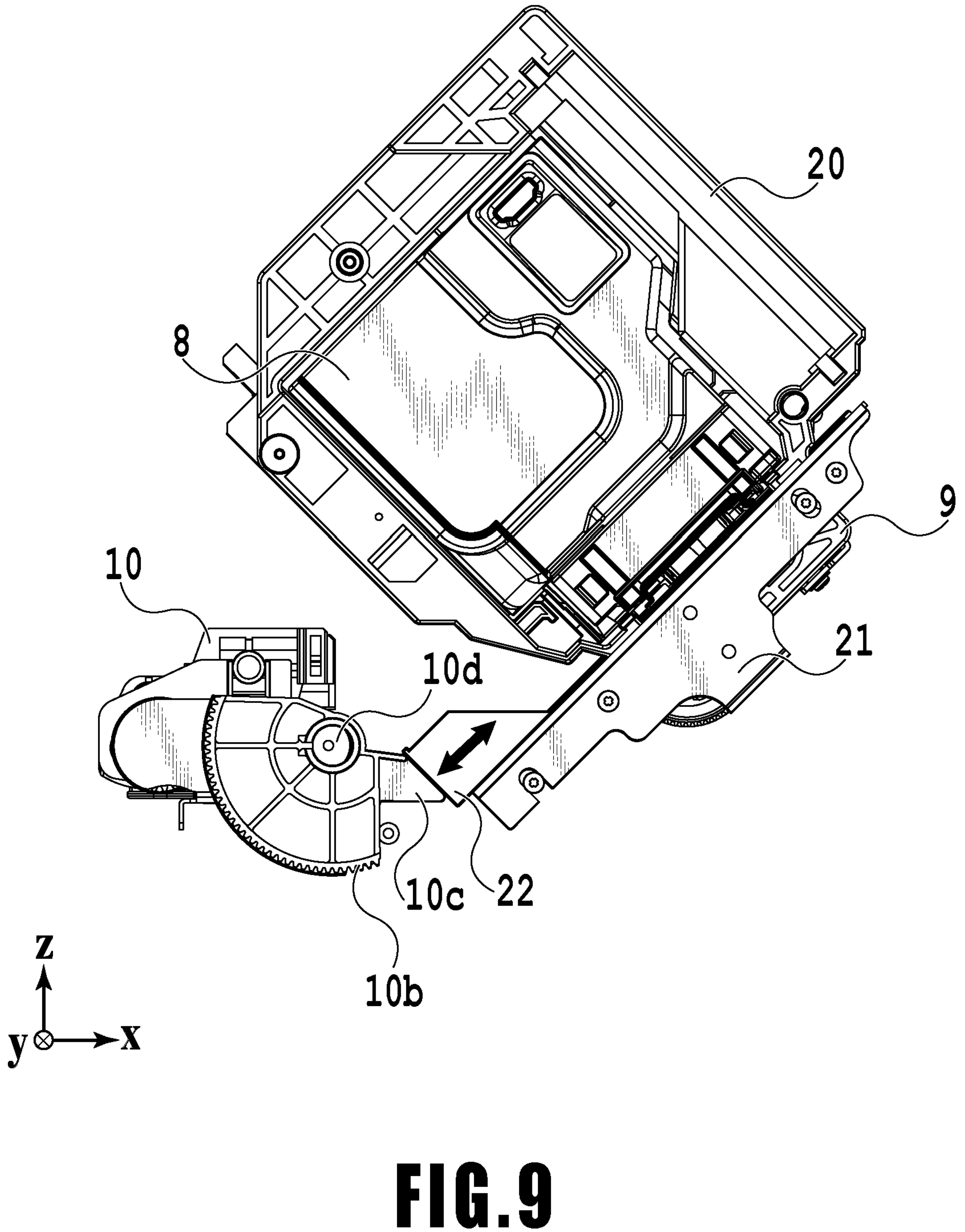
FIG. 9 is an enlarged view showing the vicinity of the print head.

A description will be given in detail of operation for print preparation featuring the present invention. FIG. 9 is an enlarged view showing the vicinity of the print head 8 in the printing state shown in FIG. 3. FIG. 9 additionally shows a head holder 20, a guide member 21, and a cap drive gear 10*b* for moving a cap that are omitted in FIG. 3.

The print head 8 is mounted on the box-shaped head holder 20, thus configuring the print head unit. In the print head unit, the orientation or position of the print head 8 is changed according to the parallel movement and rotational movement of the head holder 20. The guide members 21, each of which has a slide support surface inclined about 45° with respect to the horizontal plane, are fixed onto both sides in the y-direction of the platen 9 (i.e., backward in FIG. 9). To the slide support surface is attached a slide member 22 (i.e., a spacer member) that is slidable along the guide member 21 in a direction indicated by an arrow in FIG. 9. In the present specification, a unit configured by combining the platen 9 with the guide member 21 is referred to as a "platen unit".

The cap drive gear 10*b* for moving the cap unit 10 is disposed beside the guide member 21. The cap drive gear 10*b* is rotated on a rotary shaft 10*d* by a drive motor, not shown, under the control of the maintenance control unit 210. The cap unit 10 also is moved inside of the apparatus according to the rotation of the cap drive gear 10*b* so that the movement position of the cap unit 10 is determined according to the rotational amount of the cap drive gear 10*b*.

To the cap drive gear 10*b* is fixed a lever 10*c* that is turned integrally therewith. When the apparatus is in the printing state shown in FIG. 9, the cap unit 10 is located in the evacuation position apart from the print head 8, as already described with reference to FIG. 3. The tip of the lever 10*c* abuts against the slide member 22 fixed onto the guide member 21 in the evacuation position.

Figure 10A:
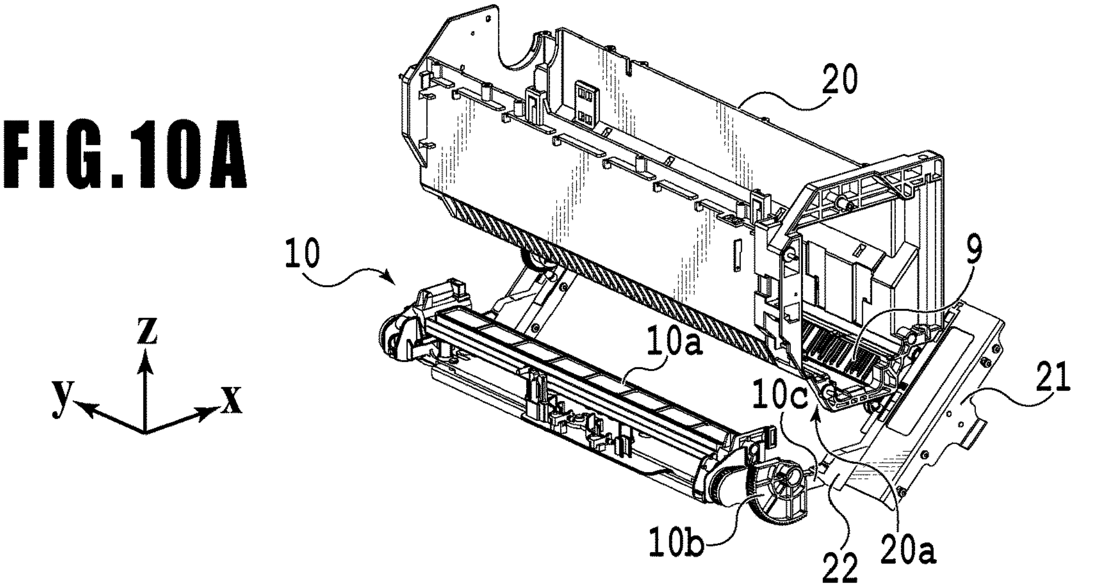
FIGS. 10A and 10B are views showing the positional interrelationship among a cap unit, a slide member, and a head holder.
Figure 10B:
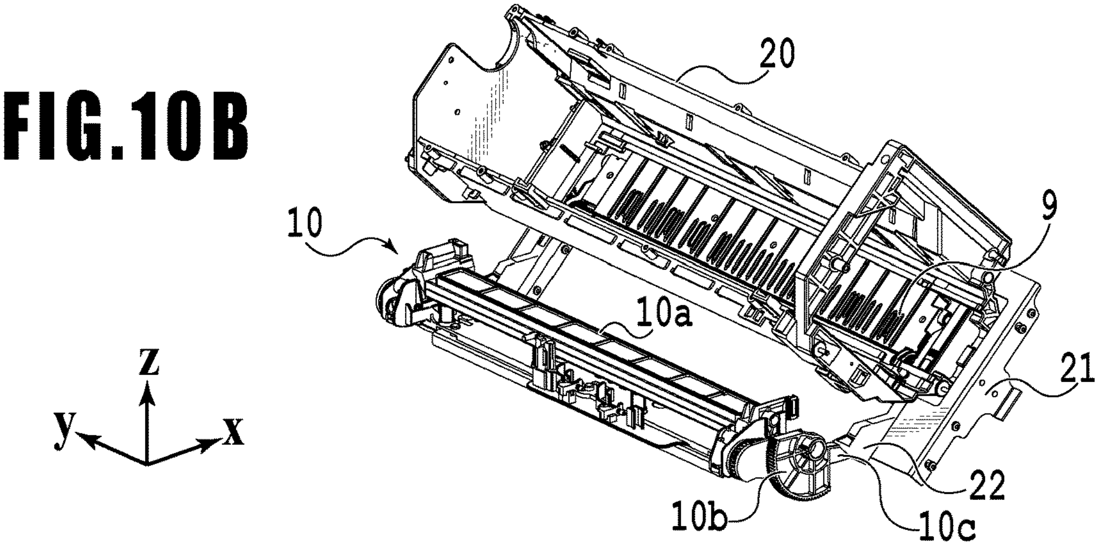
Figure 10C:
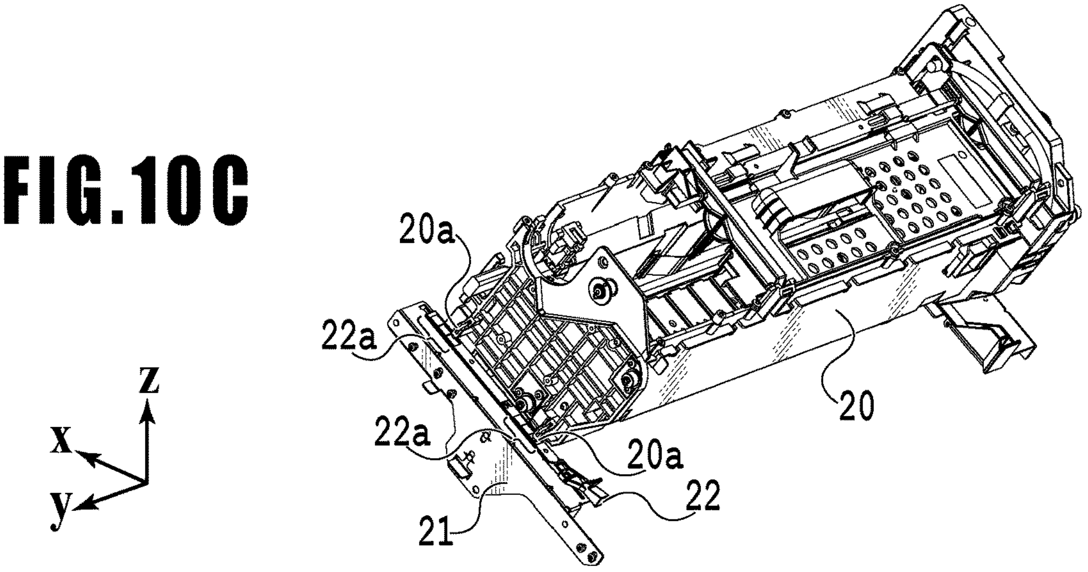
FIG. 10C is a perspective view showing the head holder and the slide member, as viewed on the back side of the printing apparatus (i.e., downstream in a y-direction), in FIG. 10B in which the print head is positioned.

FIGS. 10A and 10B are perspective views showing the positional interrelationship among the cap unit 10, the slide member 22, and the head holder 20 when the apparatus transits from the standby state to the printing state. FIG. 10A shows a state in which the cap unit 10 is separated from the print head 8, and FIG. 10B shows a state in which the head holder 20 is further rotated and moved from the state shown in FIG. 10A so as to position the print head 8. FIG. 10C is a perspective view showing the head holder 20 and the slide member 22, as viewed on the back side of the printing apparatus 1 (i.e., downstream in the y-direction), in FIG. 10B in which the print head 8 is positioned. Here, for the sake of explanation, FIGS. 10A to 10C show a state in which the print head 8 is removed from the head holder 20.

As is obvious from FIGS. 10A and 10B, the cap drive gear 10*b*, the lever 10*c*, the guide member 21, and the slide member 22, which are shown in FIG. 9, are symmetrically disposed on both sides of the head holder 20 in the y-direction. Moreover, as shown in FIG. 10C, reference portions 20*a* (i.e., abutment portions) are formed upstream and downstream of the conveyance at the lower portion of the head holder 20. When the head holder 20 is rotated and moved from the state shown in FIG. 10A to the state shown in FIG. 10B, the reference portions 20*a* face predetermined portions of the slide member 22 on the guide member 21 in abutment.

Figure 11:
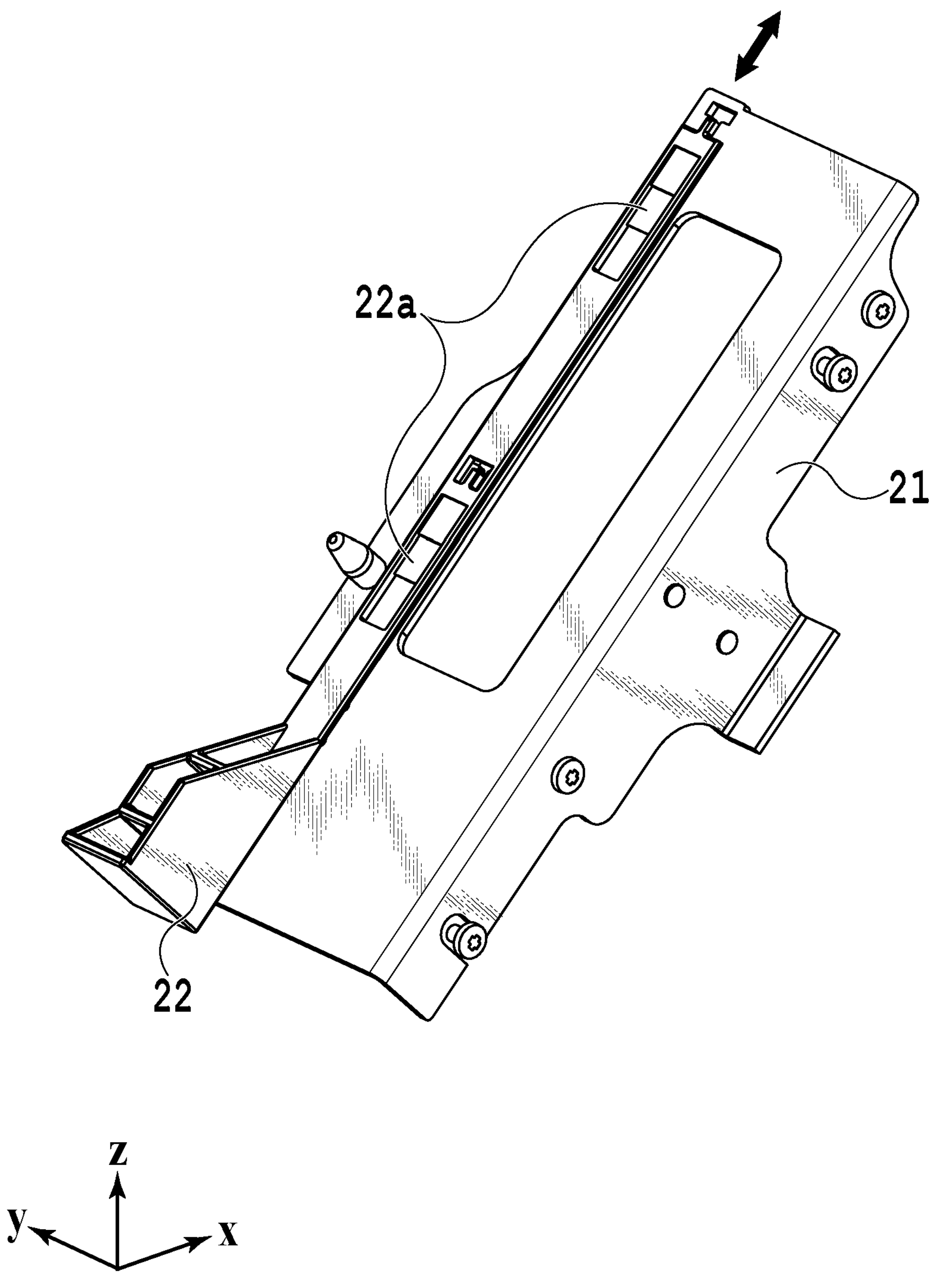
FIG. 11 is an enlarged view showing a guide member and the slide member.

FIG. 11 is an enlarged view showing the guide member 21 and the slide member 22. The guide member 21 has a smooth surface (i.e., a slide support surface) and is housed inside of the apparatus such that the surface forms almost 45° with respect to the horizontal plane. The slide member 22 can slide on the guide member 21 in directions indicated by a double-headed arrow. The slide amount varies according to the amount of the lever 10*c* of the cap unit 10 that pushes the lower end of the slide member 22 slantwise upward. The slide member 22 has two abutment surfaces 22*a* (i.e., stepwise surfaces) at upstream and downstream portions corresponding to the reference portions 20*a* of the head holder 20, each of the abutment surfaces 22*a* being formed of a plurality of stepwise surfaces having different heights. With this configuration, only one surface actually abutting against the reference portion 20*a* of the head holder 20 is chosen from the abutment surfaces 22*a* according to the slide amount of the slide member 22. In this manner, the abutment of the surface having what height at the abutment surface 22*a* against the reference portion 20*a* defines the distance between the ejection opening surface 8*a* of the print head 8 and the platen 9, that is, a print gap. In other words, the slide member 22 (i.e., the spacer member) functions as a spacer (i.e., a distance defining member) for defining any one of a plurality of distances (i.e., the print gaps) as a distance between the ejection opening surface 8*a* of the print head 8 and the platen 9.

Figure 12A:
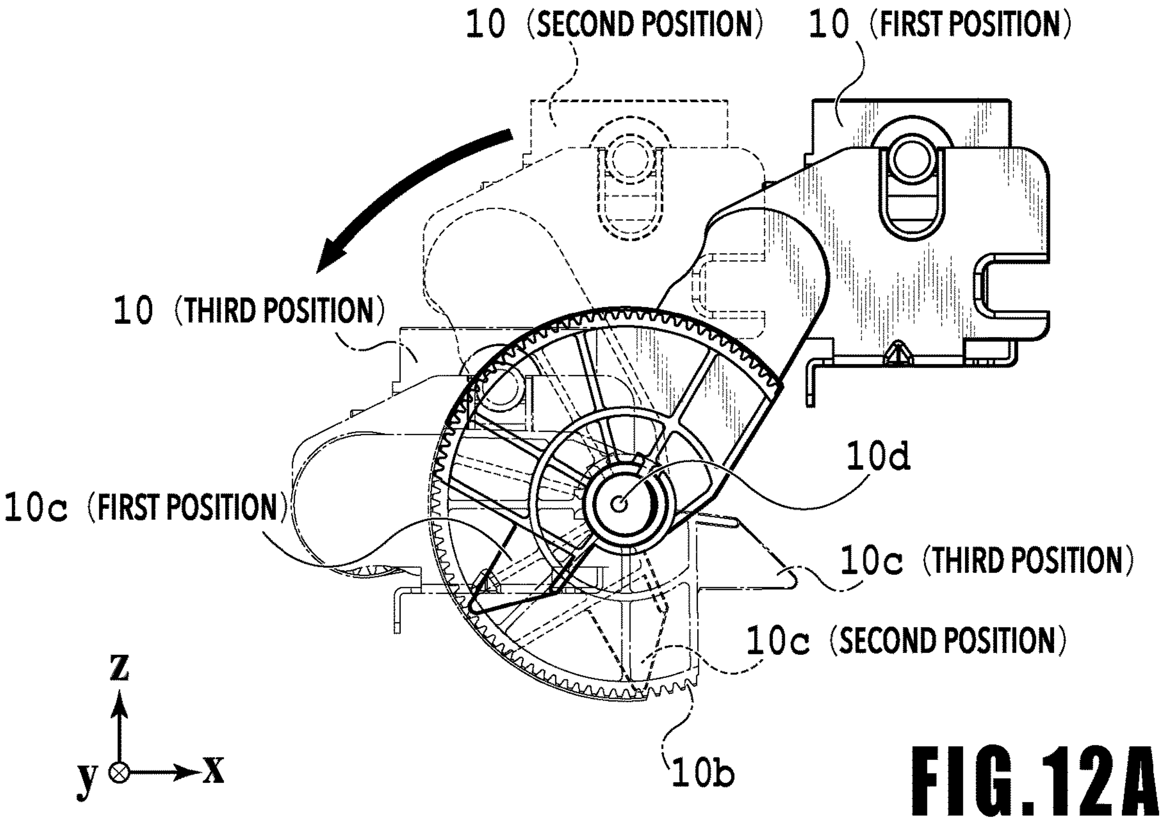
FIGS. 12A and 12B are views showing the positional relationship between the cap unit and a lever.
Figure 12B:
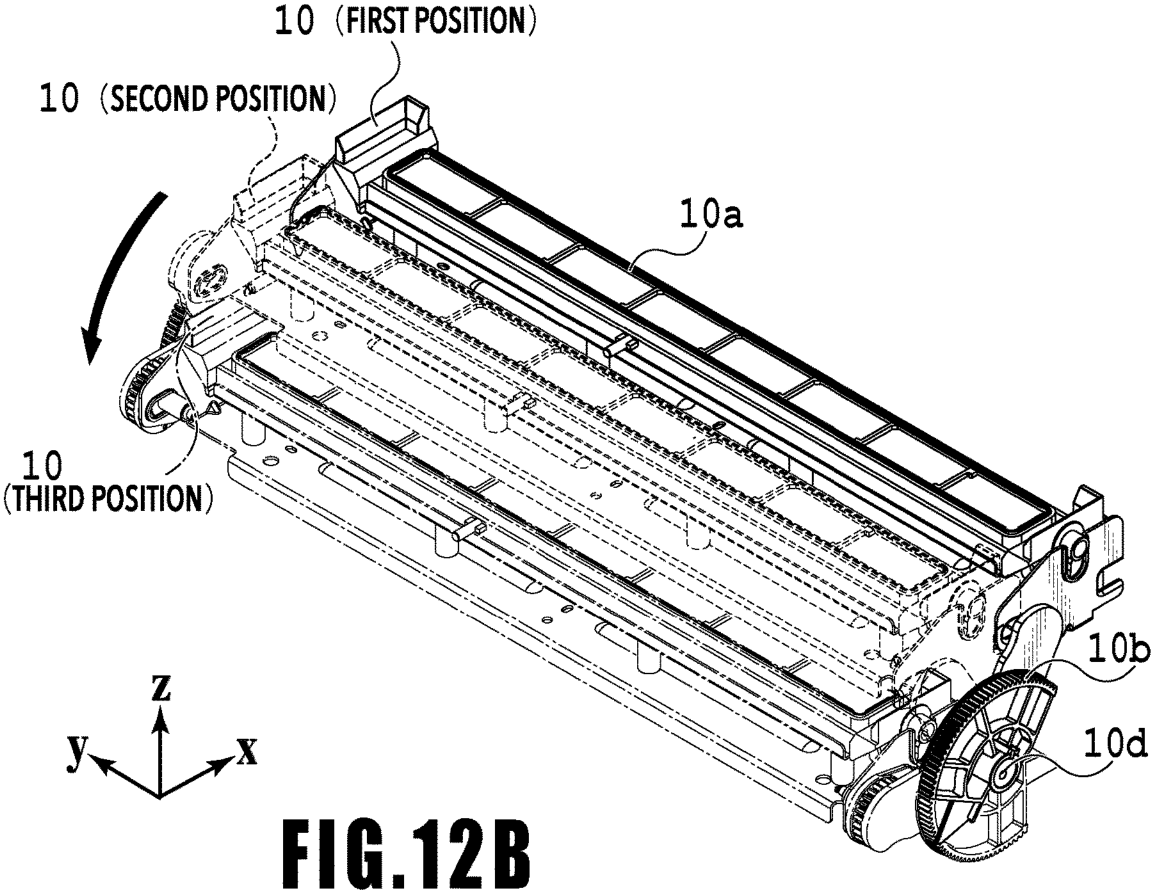

In the present embodiment, the position of the lever 10*c* for determining the slide amount of the slide member 22 depends on the movement position of the cap unit 10. FIGS. 12A and 12B are a diagram and a view, respectively, illustrating the positional relationship between the cap unit 10 and the lever 10*c* according to the rotation of the cap drive gear 10*b*. FIG. 12A is a side view as viewed in a −y-direction and FIG. 12B is a perspective view. When the cap drive gear 10*b* is rotated on the rotary shaft 10*d*, the cap unit 10 also is moved on the rotary shaft while the capping surface of the cap member 10*a* is oriented upward in a vertical direction (i.e., a +z-direction). FIGS. 12A and 12B show a first, a second, and a third position where the cap unit 10 can be positioned on its movement path.

The first position is a capping position where the printing apparatus is in the standby state and the cap unit 10 protects (caps) the ejection opening surface 8*a* of the print head 8. In the first position, the lever 10*c*, located opposite to the cap unit 10 relative to the rotary shaft 10*d*, stays out of contact with the slide member 22.

The second position shows the cap unit 10 when the printing apparatus prints an image on, for example, a thick paper. In the second position, the cap unit 10 is separated from the ejection opening surface 8*a* of the print head 8 whereas the lever 10*c* contacts with the slide member 22 (not shown in FIGS. 12A and 12B) and pushes up the slide member 22 by a first distance on the guide member 21. Consequently, when the head holder 20 is rotated so that the ejection opening surface 8*a* faces the platen 9, a relatively high surface among the abutment surfaces 22*a* abuts against the reference portion 20*a* of the head holder 20, thereby securing a relatively great print gap. In this manner, even if a thick paper or the print medium S that is liable to wave is conveyed, it can be prevented from being brought into contact with the ejection opening surface 8*a* of the print head 8. Hereinafter, the second position is referred to as a thick paper position in the present specification.

The third position shows the cap unit 10 when the printing apparatus prints an image on a regular sheet (that is thinner than the thick paper). In the third position, the cap unit 10 is separated from the ejection opening surface 8*a* of the print head 8 whereas the lever 10*c* pushes the slide member 22 slantwise upward by a second distance greater than the first distance on the guide member 21 in contact therewith. As a consequence, when the head holder 20 is rotated so that the ejection opening surface 8*a* faces the platen 9, a relatively low surface among the abutment surfaces 22*a* is brought into contact with the reference portion 20*a* of the head holder 20, thus securing a relatively small print gap. In this manner, it is possible to print a high quality image having a little print displacement on the print medium conveyed. Hereinafter, the third position is referred to as a regular position in the present specification.

Here, the slide member 22 is biased slantwise downward (45°) by a spring, and the lever 10*c* pushes the lower end of the slide member so as to slide it slantwise upward against the bias of the spring. When the cap unit 10 is returned to the first position, the slide member 22 is returned to its original lowest position by the bias of the spring. Here, the guide member 21 has the slide surface inclined at 45°. In view of this, the slide member 22 may be configured to be returned to its original position by its own weight without any bias of a spring.

The above-described first position (capping position), second position (thick paper position), and third position (regular position) are positions of the cap unit 10 on the way of the path on which it is moved counterclockwise in the drawings while the printing apparatus transits from the standby state to the printing state. The slide insertion amount of the slide member 22 for achieving a target print gap depends on the rotational amount of the cap unit 10 that is separated from the ejection opening surface 8*a*. The slide member 22 automatically slides in association with operation for moving the cap unit 10, thus saving a user the trouble. With the above-described configuration, the movement of the cap unit 10 and the movement of the spacer member 22 can be performed in parallel.

In the present embodiment, a switching between the thick paper position and the regular position is performed by the print controller 202 shown in FIG. 2 switches. In the case where, for example, a print medium S set in response to a print command input by the host apparatus 400 is a thick paper or a sheet that is liable to wave, the print controller 202 sets the thick paper position, and then, prepares for a printing operation. More specifically, the print controller 202 rotates the cap drive gear 10*b* via the maintenance controller 210 so as to stop it in the second position. Thereafter, the print controller 202 rotates the head holder at 45° via the head carriage controller 208, and then, positions the print head 8. In this manner, a relatively great print gap is defined between the ejection opening surface 8*a* and the platen.

In contrast, in the case where a type of print medium S set in response to a print command is other than the above-described types, the print controller 202 sets the regular position, and then, prepares for a printing operation. More specifically, the print controller 202 rotates the cap drive gear 10*b* via the maintenance controller 210 so as to stop it in the third position. Thereafter, the print controller 202 rotates the head holder at 45° via the head carriage controller 208, and then, positions the print head 8. In this manner, a relatively small print gap is defined between the ejection opening surface 8*a* and the platen.

Whether the print controller 202 sets the thick paper position or the regular position may be based on a set print mode, besides the type of print medium to be used. The print controller 202 sets the regular position in the case of, for example, simplex printing; in contrast, the print controller 202 may set the thick paper position in order to avoid any contact caused by cockling in the case of, for example, duplex printing. In consideration of the usage of a printout or a quality that is required, a user may switch the thick paper position that means a "head rubbing avoiding position" and the regular position that means an "image quality-oriented position" via the operating panel 104 operated by a user. Moreover, although the present embodiment is configured to switch the two types of print gaps, three types or more of print gaps, such as a print gap at an "envelope position," at which an envelope is printed, may be switched.

FIGS. 10A and 10B sequentially show the state in which the cap unit 10 is separated from the ejection opening surface 8*a* and the state in which the head holder 20 is rotated from the separation state. Both of these two operations may be performed at the same time or partly overlap each other. In this case, the print controller 202 controls the movement of the cap unit 10 by a second drive motor serving as cap moving unit and the rotation of the head holder 20 by the first drive motor serving as the head moving unit while preventing any corrosion. These two operations are performed in parallel, thus completing, in a shorter period of time, a series of print preparations required for separating the print head 8 from the cap unit 10, inserting the slide member 22, and positioning the print head.

Moreover, the above-described embodiment is configured such that both of the cap unit 10 and the print head 8 are rotated or moved inside of the apparatus between the standby state and the printing state. However, the present invention is not limited to this mode. For example, as disclosed in U.S. Pat. No. 8,430,585, even if the print head is configured to be moved only in a vertical direction, the present invention is applicable to a mode in which an association mechanism that inserts the spacer for adjusting the print gap in a print head descending position in association with the separation of the cap member is provided. Here, like the above-described embodiment, with the configuration in which the movement or rotation of the cap unit 10 and the print head 8 switches the standby state and the printing state, the occupied space and movement distance covering the entire movement of the units can be reduced much more than that in the configuration disclosed in U.S. Pat. No. 8,430,585. Consequently, both of time and space required for the print preparation can be reduced in comparison with the configuration disclosed in U.S. Pat. No. 8,430,585.

Additionally, the first, second, and third positions are prepared on the rotation path of the cap drive gear 10*b* with reference to FIGS. 12A and 12B in the above-described embodiment. However, the present invention is not limited to this mode. The number of abutment surfaces 22*a* that can achieve a target print gap may be three or more. Furthermore, an abutment surface may have a single height. In this case, two print gaps can be formed: a print gap when the reference portion abuts against an abutment surface and a print gap when the reference portion abuts directly against the slide support surface. An abutment surface of the slide member 22 against the reference portion 20*a* may not always be required to be formed into a stepwise surface. For example, a wedge-like slide member having an inclination that is inclined in an insertion direction may be used as an abutment surface, and the reference portion 20*a* may abut in an arbitrary position at the inclination, thus continuously varying a print gap.

In addition, in the above-described embodiment, the guide members 21 for supporting the slide member 22 are prepared on both sides of the platen 9 in the y-direction. However, the guide member 21 is not essential according to the present invention. As long as the platen 9 per se has sufficient rigidity, the slide member 22 may slide directly on the platen 9.

At any rate, as long as there is position for inserting the slide member 22 to achieve a predetermined print gap on the path on which the cap unit 10 abuts against or is separated from the print head 8, efficient print preparation can be effectively achieved according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094766, filed May 11, 2017, which is hereby incorporated by reference herein in its entirety.

What is claimed is:

1. An inkjet printing apparatus comprising:

a head unit including a print head provided with an ejection opening surface, the print head being configured to perform a print operation by ejecting ink in an ejecting direction to a print medium;

a platen unit including a platen having a support surface to support the print medium opposite to the ejection opening surface in a state in which the print head performs the print operation;

a cap member configured to cap the ejection opening surface;

a cap moving unit configured to move the cap member between (a) a capping position, in which the cap member is capable of capping the ejection opening surface, and (b) a separating position, in which the cap member is moved from the capping position in an opposite direction to the ejection opening surface; and a spacer member configured to define a print gap, suitable for the print operation, between the ejection opening surface and the support surface of the platen in the ejecting direction by abutting against the head unit, wherein the spacer member is moved to define the print gap while the cap moving unit moves the cap member to the separating position.

2. The inkjet printing apparatus according to claim 1, wherein the spacer member has an abutment surface against which the head unit abuts, and wherein a moving distance of the spacer member is varied according to a moving amount of the cap member so as to change the position of the abutment surface.

3. The inkjet printing apparatus according to claim 1, wherein the spacer member has an abutment surface against which the head unit abuts, and wherein the abutment surface includes a first surface having a first height and a second surface having a second height that is greater than the first height.

4. The inkjet printing apparatus according to claim 1, wherein the separating position includes (a) a first separating position in which the print gap is set to a first gap and (b) a second separating position in which the print gap is set to a second gap larger than the first gap.

5. The inkjet printing apparatus according to claim 1, wherein the cap moving unit rotates the cap member between the capping position and the separating position.

6. The inkjet printing apparatus according to claim 1, wherein the print head comprises ejection ports arranged in an area corresponding to a width of a print medium.

7. The inkjet printing apparatus according to claim 1, wherein the print gap is set according to one of (a) a type of print medium to be printed or (b) a print mode.

8. The inkjet printing apparatus according to claim 1, wherein the print head moves between (a) a position in which the ejection opening surface is capable of being capped with the cap member and (b) a position in which the print head is capable of performing the print operation.

9. An inkjet printing apparatus comprising:

a head unit including a print head provided with an election opening surface, the print head being configured to perform a print operation by ejecting ink in an ejecting direction to a print medium;

a platen unit including a platen having a support surface to support the print medium opposite to the ejection opening surface in a state in which the print head performs the print operation;

a cap member configured to cap the election opening surface;

a cap moving unit configured to move the cap member with respect to the ejection opening surface; and a spacer member configured to be moved to define a print gap, suitable for the print operation, between the ejection opening surface and the support surface of the platen in the ejecting direction by an abutment surface against which the head unit abuts, wherein the head unit moves the print head between (a) a printing position, at which the ejection opening surface faces the support surface of the platen, and (b) a standby position, at which the ejection opening surface does not face the support surface, and wherein the abutment surface includes (a) a first surface having a first height and (b) a second surface having a second height that is greater than the first height.

10. The inkjet printing apparatus according to claim 9, wherein the spacer member is moved in association with an operation in which the cap moving unit moves the cap member.

11. The inkjet printing apparatus according to claim 10, wherein a moving distance of the spacer member is varied according to a moving amount of the cap member so as to change the position of the abutment surface.

12. The inkjet printing apparatus according to claim 9, wherein the print head comprises ejection ports arranged in an area corresponding to a width of a print medium.

13. The inkjet printing apparatus according to claim 9, wherein the print gap is set according to one of (a) a type of print medium to be printed or (b) a print mode.

14. An inkjet printing apparatus comprising:

a head unit including a print head provided with an ejection opening surface, the print head being configured to perform a print operation by ejecting ink in an ejecting direction to a print medium;

a platen unit including a platen having a support surface to support the print medium opposite to the ejection opening surface in a state in which the print head performs the print operation;

an operation member configured to operate the ejection opening surface;

a moving unit configured to move the operation member between (a) a first position in which the operation member is capable of operating the ejection opening surface, and (b) a second position in which the operation member is not capable of operating the ejection opening surface; and a spacer member configured to define a print gap, suitable for the print operation, between the ejection opening surface and the support surface of the platen in the ejecting direction by abutting against the head unit, wherein the spacer member is moved to define the print gap while the moving unit moves the operation member to the second position.

15. The inkjet printing apparatus according to claim 14, wherein the print head comprises ejection ports arranged in an area corresponding to a width of a print medium.

16. The inkjet printing apparatus according to claim 14, wherein the print gap is set according to one of (a) a type of print medium to be printed or (b) a print mode.

* * * * *